United States Patent
Karttaavi et al.

(10) Patent No.: US 9,213,872 B2
(45) Date of Patent: Dec. 15, 2015

(54) METHOD AND APPARATUS FOR DISCRIMINATION OF RFID TAGS

(75) Inventors: Timo Petteri Karttaavi, Espoo (FI); Ilkka Hermanni Hakala, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 218 days.

(21) Appl. No.: 13/579,558

(22) PCT Filed: Feb. 18, 2010

(86) PCT No.: PCT/IB2010/000319
§ 371 (c)(1),
(2), (4) Date: Sep. 6, 2012

(87) PCT Pub. No.: WO2011/101695
PCT Pub. Date: Aug. 25, 2011

(65) Prior Publication Data
US 2012/0319821 A1    Dec. 20, 2012

(51) Int. Cl.
*G06K 7/00* (2006.01)
*G06K 7/10* (2006.01)

(52) U.S. Cl.
CPC .......... *G06K 7/10019* (2013.01); *G06K 7/0008* (2013.01); *G06K 7/10089* (2013.01); *G06K 7/10346* (2013.01)

(58) Field of Classification Search
CPC .................. G06K 7/10089; G06K 7/10346
USPC ........ 340/10.1, 10.2, 10.3, 10.4, 10.5, 539.11
See application file for complete search history.

(56) References Cited

U.S. PATENT DOCUMENTS

| | | | | |
|---|---|---|---|---|
| 6,140,982 | A * | 10/2000 | Fuchter et al. | 345/45 |
| 8,674,810 | B2 * | 3/2014 | Uysal et al. | 340/10.4 |
| 2004/0046642 | A1 * | 3/2004 | Becker et al. | 340/10.32 |
| 2009/0051496 | A1 * | 2/2009 | Pahlavan et al. | 340/10.2 |
| 2009/0160638 | A1 | 6/2009 | Jesme | |
| 2009/0278665 | A1 * | 11/2009 | Raggam et al. | 340/10.5 |
| 2010/0188211 | A1 * | 7/2010 | Brommer et al. | 340/539.32 |

FOREIGN PATENT DOCUMENTS

| | | |
|---|---|---|
| EP | 1233531 A1 | 8/2002 |
| EP | 1919091 A1 | 5/2008 |
| WO | 2010/105633 A1 | 9/2010 |

OTHER PUBLICATIONS

Office Action received for corresponding Chinese Application No. 201080064129.9, dated Mar. 31, 2014, 8 pages.
Pursula et al., "Millimeter-Wave Identification—A New Short-Range Radio System for Low-Power High Data-Rate Applications", IEEE Transactions on Microwave Theory and Techniques, vol. 56, Issue: 10, Oct. 2008, pp. 2221-2228.
International Search Report and Written Opinion received for corresponding International Patent Application No. PCT/IB2010/000319, dated Nov. 4, 2010, 12 pages.

(Continued)

*Primary Examiner* — Andrew Bee
(74) *Attorney, Agent, or Firm* — Locke Lord LLP (57) ABSTRACT

In one or more embodiments described herein, there is provided an apparatus that is configured to determine respective signal strengths of radio frequency identification signalling received from multiple sources by a directional antenna. The apparatus is also configured to discriminate the radio frequency identification signalling from a particular source based on the particular signal strength of the radio frequency identification signalling received from that source.

11 Claims, 4 Drawing Sheets

(56) References Cited

OTHER PUBLICATIONS

Hartmann et al., "Anti-Collision Methods for Global SAW RFID Tag Systems", IEEE Ultrasonics Symposium, vol. 2, Aug. 23-27, 2004, pp. 805-808.

Plessky, "Review on SAW RFID Tags", IEEE International Frequency Control Symposium joint with the 22nd European Frequency and Time forum, Apr. 20-24, 2009, pp. 14-23.

Extended European Search Report received for corresponding European Patent Application No. 10846021.3, dated Jun. 23, 2014, 5 pages.

* cited by examiner

METHOD AND APPARATUS FOR DISCRIMINATION OF RFID TAGS

RELATED APPLICATION

This application was originally filed as PCT Application No. PCT/IB2010/000319 filed Feb. 18, 2010.

TECHNICAL FIELD

The present disclosure relates to the field of radio frequency identification signalling, associated apparatus, computer programs and related methods. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs). Certain other disclosed aspects/embodiments relate to radio frequency identification tags (RFID tags) and associated signalling.

The portable electronic devices/apparatus according to one or more disclosed aspects/embodiments may provide one or more audio/text/video communication functions (for example, tele-communication, video-communication, and/or text transmission (Short Message Service (SMS)/Multimedia Message Service (MMS)/emailing) functions), interactive/non-interactive viewing functions (for example, web-browsing, navigation, TV/program viewing functions), music recording/playing functions (for example, MP3 or other format and/or (FM/AM) radio broadcast recording/playing), downloading/sending of data functions, image capture function (for example, using a (for example, in-built) digital camera), and gaming functions.

BACKGROUND

Radio-frequency identification (RFID) in its various configurations is a widely used technology and well known in the art. This technology is so widely used in many applications that RFID tags need to be produced at very low cost and ideally consume minimal power. This can result in a restricted reading range.

Currently, RFID systems operate mainly at frequencies below 2.4 GHz. The relatively long wavelength means that practical antenna structures are electrically small and no significant directivity can be achieved. The systems either read all tags within a certain range or some kind of addressing scheme is needed.

Current RFID technology currently uses an addressing scheme that operates via reading unique identities of one or more RFID tags (or other such radio frequency signalling sources). If a user wishes to read a particular tag via selective reading, an RFID reader presently known in the art will set up an electromagnetic field for reading RFID tags (or other such radio frequency identification sources). All tags within that field then respond to the reader indicating their own unique identity. Once the RFID reader has determined the identities of each transmitting/responding RFID tag, the reader then instructs each tag in turn to transmit in isolation until it identifies the particular source it is interested in. After this point, communication between the RFID tag of interest and the RFID reader can begin.

With current RFID systems, selective tag reading can only be done from a very short distance (as in near-field-communications, NFC) or by using pre-existing information about the tag (identification by address code etc). The tag identity cannot be directly linked to its location when several tags are read.

P. Pursula, T. Vaha-Heikkila, A. Muller, D. Neculoiu, G. Konstantinidis, A. Oja, J. Tuovinen, "Millimeter-Wave Identification—A New Short-Range Radio System for Low-Power High Data-Rate Applications," IEEE Transactions on Microwave Theory and Techniques, Volume 56, Issue 10, pp. 2221-2228, October 2008 discusses the use of millimeter waves with RFID technology (for example, using low-power or passive backscattering tags for short-range high data rate applications).

A directive antenna beam, such as those achieved using millimeter wave frequencies can help in selective reading of a single tag. However, even with millimeter-wave antennas, practical and technological issues present in the art limit radio frequency identification systems to a level that does not entirely eliminate co-channel interference when the unwanted tags transmit within range.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus, the apparatus configured to:
  determine respective signal strengths of radio frequency identification signalling received from multiple sources by a directional antenna; and
  discriminate the radio frequency identification signalling from a particular source based on the particular signal strength of the radio frequency identification signalling received from that source.

This helps to identify a particular source of interest by way of the signal strength of its radio frequency identification signalling.

The apparatus may be configured to allow selection of a particular source by orientation of the directional antenna in the direction of that particular source.

The directional antenna may be an antenna array. For example, the directional antenna may comprise one or more antennas arranged in such a way so as to provide a particular radiation pattern. The antenna array may therefore be switchable between one or more radiation patterns, or one or more antenna modes.

The directional antenna may be configured to have a directional antenna mode and a monopulse antenna mode, the apparatus also being configured to determine respective signal strengths of radio frequency identification signalling received from multiple sources by a directional antenna in the monopulse antenna mode. The directional antenna may be configured to switchable between the two modes, or to be able to operate in both modes simultaneously.

The apparatus may be configured to discriminate the radio frequency identification signalling from the particular source based on a comparison between the respective signal strengths of radio frequency identification signalling received from the multiple sources.

The apparatus may be configured to receive radio frequency signalling from radio frequency identification tags.

The apparatus may be configured to receive radio frequency from one or more of: active, semi-active, semi-passive, passive radio frequency identification tags.

The apparatus may be configured to operate on and/or receive high frequency radio frequency signalling.

The high frequency radio signalling may be above 2.4 GHz, may be between 2.4 GHz and 60 GHz, may be 60 Ghz, or may be above 60 GHz (such as 122, 244 GHz, etc or the like). Antennas operating on this frequency have a highly directional radiation pattern. Therefore, operating at a high frequency helps to create a directional antenna or antenna array.

The apparatus may be configured to allocate transmission times to each of the respective sources such that the respective signalling from the multiple sources received by the directional antenna do not overlap in time.

The apparatus may be configured to allocate transmission times in accordance with a time-division multiplexing protocol. Allocation of specific transmission times to one or more sources (such as RFID tags) can be considered to be a synchronous time division multiplexing scheme/protocol.

In another aspect, there is provided an apparatus configured to provide radio frequency identification signalling at one or more predetermined intervals, the intervals having a degree of clock offset associated therewith.

This provides an apparatus that can provide radio frequency signalling at set intervals, with a slight variation in the exact time of transmission introduced by the clock jitter associated with that interval. This slight variation allows for a number of such apparatus to be in operation at the same time without each providing radio frequency signalling in synchrony with one another. This in turn allows each of their respective signalling to be distinct from one another.

In another aspect, there is provided a system comprising the apparatus of the first aspect, and one or more apparatus of the aspect immediately above. This provides a system whereby the apparatus of the first aspect receives/reads signalling provided by the apparatus of the aspect immediately above.

In another aspect, there is provided a processor configured to:
determine respective signal strengths of radio frequency identification signalling received from multiple sources by a directional antenna; and
discriminate the radio frequency identification signalling from a particular source based on the particular signal strength of the radio frequency identification signalling received from that source.

In another aspect, there is provided a processor comprising the apparatus of the first aspect.

In a further aspect, there is provided an apparatus, the apparatus comprising:
means for determining respective signal strengths of radio frequency identification signalling received from multiple sources by a directional antenna; and
means for discriminating the radio frequency identification signalling from a particular source based on the particular signal strength of the radio frequency identification signalling received from that source.

In yet another aspect, there is provided a method comprising:
determining respective signal strengths of radio frequency identification signalling received from multiple sources by a directional antenna; and
discriminating the radio frequency identification signalling from a particular source based on the particular signal strength of the radio frequency identification signalling received from that source.

In another aspect, there is provided computer program code stored on a computer readable medium, wherein the code is configured to, upon being executed:
determine respective signal strengths of radio frequency identification signalling received from multiple sources by a directional antenna; and
discriminate the radio frequency identification signalling from a particular source based on the particular signal strength of the radio frequency identification signalling received from that source.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

DESCRIPTION OF EXAMPLE ASPECTS/EMBODIMENTS

In one or more embodiments described herein, there is provided an apparatus that is configured to determine respective signal strengths of radio frequency identification signalling received from multiple sources by a directional antenna. The apparatus is also configured to discriminate the radio frequency identification signalling from a particular source based on the particular signal strength of the radio frequency identification signalling received from that source.

This apparatus allows for discrimination and identification of a particular source via the respective signal strengths received from multiple sources. Through doing this, it is possible to selectively read a particular radio frequency signalling source without necessarily having to establish its radio frequency identity (as is presently the addressing scheme used in the prior art).

For example, if a user was interested in a particular source (such as an RFID tag), the user could physically point this apparatus at a particular desired source to indicate the selection of that source. By way of the directional antenna, the apparatus would then be able to discriminate that source from other sources based on that source's particular signal strength. One advantage to this arrangement is that the information of a particular source can be read at the same time as discrimination of that source. A radio frequency identification source can therefore be read selectively from a distance by pointing at it without any prior knowledge of its identity. In the prior art, identity must first be established before selective reading can occur.

This arrangement allows for selective reading of desired radio frequency signalling sources (such as RFID tags) from a distance by only pointing the above apparatus at such a tag. No networking address or identification information regarding the radio frequency signalling source is needed beforehand (unlike the prior art). This also means that multiple sources can all transmit using the same frequency channel and selective reading of a particular tag can still be performed.

Figure 1A:
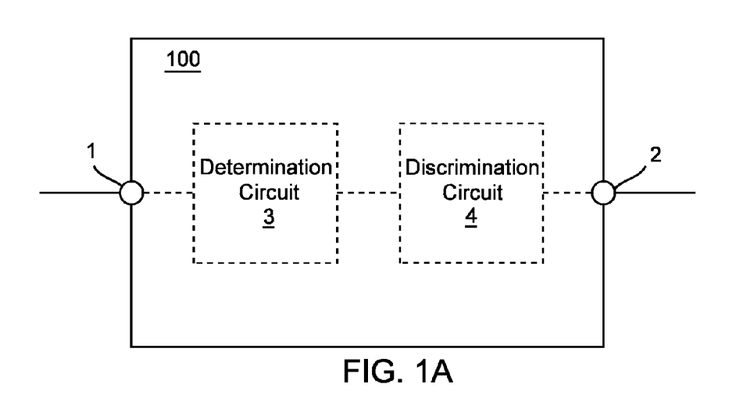
FIG. 1a illustrates an apparatus according to a first embodiment of the present disclosure.

We will now describe a first embodiment of apparatus 100 with reference to FIG. 1a. Apparatus 100 comprises an input 1, an output 2, a determination circuit 3, and a discrimination circuit 4.

In this embodiment, the apparatus 100 is a processor. The processor is an Application Specific Integrated Circuit (ASIC) that has functional blocks providing each component integrally formed as part of the processor (described in detail below). The skilled person will appreciate that in other embodiments the various components may be separate from each other and/or distributed separately/remotely from each other.

The input 1 is for receiving radio frequency signalling from multiple sources from a directional antenna. In this embodiment, the input 1 is electrically connected to a directional antenna (in other words, in electrical communication with the antenna so as to receive said signalling). In other embodiments the input 1 may actually comprise the directional antenna or may even be the directional antenna. In still other embodiments, the input 1 may not be directly connected to the directional antenna, and the directional antenna may be located remotely from the input 1 and apparatus 100.

The directional antenna in this example embodiment may operate on 60 GHz. This can help to provide a highly directional radiation pattern along a particular axis. In other embodiments, the apparatus and antenna operate on 122 GHz and/or 244 GHz or higher, and in other embodiments the apparatus and antenna operate on lower frequencies or frequencies between 2.4 GHz, 60 GHz, 122 GHz and 244 GHz, or higher. In some embodiments the antenna and apparatus may be able to operate on two or more such frequencies. The skilled person will appreciate that other such frequencies (for example, intermediate and/or non-intermediate) are within the scope of the present disclosure.

One advantage to using such high frequencies is that such millimeter frequency waves propagate through objects more easily than other frequency waves such as infrared, visible light etc. A source could therefore be placed inside of a person's clothing (e.g. a device in a pocket) and still be read irrespective of its location about a user's person.

The input 1 receives the signalling so as to pass the signalling onto the determination circuit 3.

The determination circuit 3 is a functional block integrally formed within the processor/apparatus 100. This is a specific functional block that is able to receive the radio frequency signalling from the input 1 and operate on the signalling so as to determine the respective signal strengths of the received signalling. Once the respective signal strengths are identified, the determination circuit 3 passes the information regarding the respective signal strengths of the respective signalling received via the input onto the discrimination circuit 4.

The discrimination circuit 4 is also a functional block that is integrally formed within the processor/apparatus 100. This is a specific functional block that is able to receive the information regarding the respective signal strengths from the determination circuit 3 and operate on this to discriminate a particular source from the multiple sources for which signalling has been received. This is achieved based on the particular signal strength of the particular desired 'target' source relative to the signal strengths of the multiple sources (this may be performed based on some or all of the multiple sources for which signalling has been received).

The discrimination circuit 4 is able to provide an indication as to which source is the particular desired source onwards via output 2. This allows for the information carried by a particular source to be identified and discriminated at substantially the same time that the information is being transmitted. The discrimination circuit 4 may also receive and onwardly provide the information carried by the respective signalling at the same time as receiving the respective signal strength information from the determination circuit 3 and providing the discrimination indication onwards to output 2.

The output 2 is for receiving the indication of a discriminated particular signalling source from the discrimination circuit 4. This indication can be provided onward to other components, such as a display for displaying the information carried by the discriminated particular source, or to a further apparatus for selective reading of that particular source, or the like.

In this embodiment, the input 1 and the output 2 are part of/define a connection bus that electrically interfaces the processor/apparatus 100 with a portable electronic device. The skilled person will appreciate that, in other embodiments, the input 1 and output 2 may be other components that allow for electrical communication to the processor/apparatus 100. This can allow the completed processor/apparatus 100 to be installed into a portable electronic device. The skilled person will appreciate that in other embodiments the processor/apparatus 100 may be remotely located from the portable electronic device and receive signalling at a different location.

We will now describe the assembly of this apparatus 100.

In this embodiment, the determination circuit 3 and discrimination circuit 4 are separate functional blocks that are integrally formed with the respective connected input and output 1, 2 so as to from a single processor 100. As discussed above, the skilled person will appreciate that there other embodiments in which the circuits 3, 4 are not integrally formed as a single processor but are kept as distinct functional blocks. These may be located together or separately, within a portable electronic device or remotely from such a device. For example, in other embodiments the components may be remotely located from each other, such as being distributed throughout a radio frequency identification system.

In another embodiment (shown in FIG. 1c) the processor 100 is electrically connected to memory 110. In some variations of the memory stores program code that is configured to operate the respective functional blocks of the processor 100, and in other variations to operate the processor 100 as a whole.

Figure 2A:
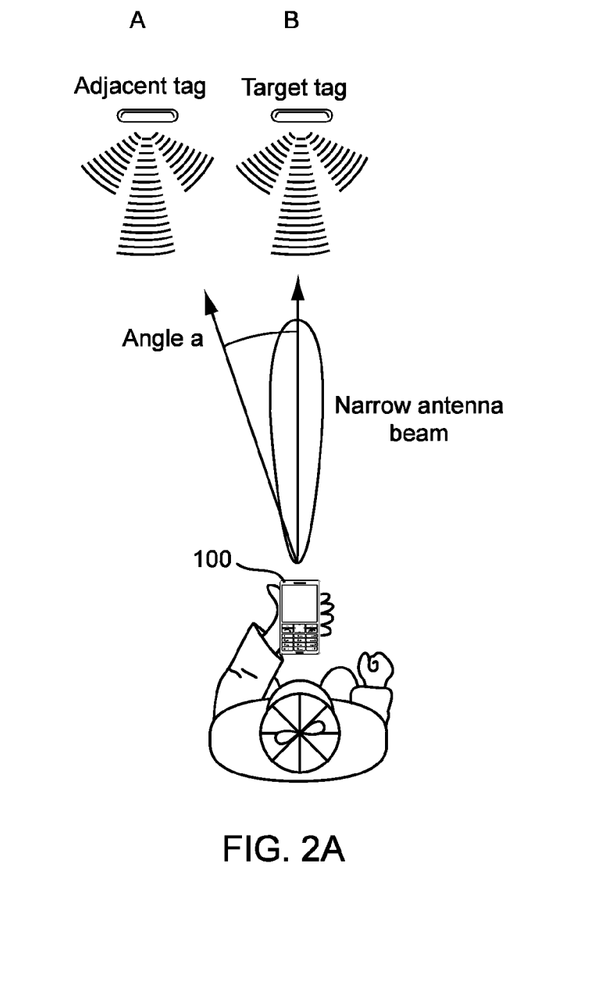
FIG. 2a illustrates one embodiment operating in a particular scenario.

We will now describe the operation of the embodiment of FIG. 1a with respect to FIG. 2a.

In FIG. 2a, there are two tags, A & B. One of these two tags (tag B) is of particular interest to the illustrated user. The user is holding an RFID tag reader in accordance with apparatus 100. This reader comprises processor/apparatus 100, a directional antenna (not shown), and a display.

The directional antenna, as discussed above, provides a specific electromagnetic field pattern that is highly directional. In this embodiment, it is highly sensitive along a single axis as is illustrated by the radiation pattern in FIG. 2a.

The display, as discussed above, is for displaying information about a particular source once it has been discriminated. Other types of output or data logging systems may be used to read and/or store information about a particular tag of interest that has been selectively read.

As the user is interested in one of the two tags (tag B rather than tag A), the user directs the reader at the desired tag. In this embodiment this involves orienting/pointing the highly sensitive axis of the directional antenna at this particular tag. The antenna then receives radio frequency identification signalling from each of the tags. Due to the highly directional radiation pattern of the antenna, this will mean that there is a difference in the respective signal strengths of the respective tags as received by the antenna.

Once the respective signalling is received by the antenna from the tags, the signalling is passed through the input 1 to the determination circuit 3. The determination circuit 3 then operates on the signalling to identify the signal strengths of the respective signalling of the first and second tags. In this embodiment the determination circuit 3 measures the maximum amplitude of the respective signalling from tag A and tag B. In other embodiments the determination circuits measures one or more other quantities, such as power spectrum or the like to determine the respective signal strengths.

Once the respective signal strengths are established by the determination circuit 3, this information is passed on to the discrimination circuit 4. The discrimination circuit 4 then operates on the signal strength information to discriminate and identify the particular source/tag of interest.

In this embodiment, as the antenna is highly directional and the antenna has been pointed directly at the tag of interest (tag B), the antenna will receive much stronger signalling from the on-axis tag than the off-axis tag. This knowledge means that the discrimination circuit can compare the respective signalling from the two tags against each other, and identify that the particular source of interest is the source with the strongest/largest signal strength. Based on this principle of operation, the discrimination circuit 4 can report that the higher signal strength represents the particular tag/source, and that the information carried in that signal is the information of interest to the user. This indication is passed to the output 2 which then causes the information carried by the particular tag/source to be displayed on the display of the reader to the user. A further advantage of this and other embodiments is that, once the address of a particular target tag of interest is known, then that tag can be directly addressed by the reader. This can help for direct communication/reading after selection and discrimination of that tag from other tags.

This is a highly simplified embodiment, and there are many other embodiments that this apparatus and the present disclosure can be applied to. We will now describe further embodiments and variations of this apparatus 100. One or more of these embodiments help to provide for more robust selective reading of particular sources of interest.

In the scenario of FIG. 2a, there may be a scenario where the interference between the two tags is such that it is difficult or impossible to actually separate the two received signals from one another. To alleviate the interference problem caused by unwanted tags, we will now describe an embodiment that utilises time division multiplex transmissions. This way the tag transmissions do not overlap and carrier-to-interference ratio is vastly improved. The reader receives the data transmission from all tags within range. The content from the desired tag is then selected by comparing the received signal strengths. Even small differences in the signal levels can now be detected.

This further embodiment is substantially the same as the first embodiment of apparatus 100, but the principle of operation is slightly different.

As in FIG. 2a, the user is interested in the same tag as the first illustration. In this situation, the tags are active tags (in other words, RFID tags with access to their own power source) that are each arranged to transmit their carried information in short pulses (such as packets), each pulse/packet occurring at a specific set intervals (such that the respective pulses from different tags do not overlap with one another, or there is a very low probability of overlap occurring).

In this embodiment, the tags are each set to transmit in the exact same manner as each other. Specifically, the tags are set to transmit such that their respective pulses are of the same duration as each other, and the interval between pulses is set to be the same duration for each tag. In this embodiment, the pulse duration is in the nanosecond range, and the interval duration is in the nanosecond to millisecond range but is of the order of at least 2-10 times longer than the pulse duration.

By setting each tag to transmit in short pulses and to leave relatively long intervals between pulses, each tag is given the opportunity to transmit their carried information in a short burst at the same time as other tags are not transmitting. The relatively long interval between transmission bursts can be considered to be a transmission window in which other tags are allowed to transmit. This helps to alleviate the issue of interference between tags that are transmitting at the same time as one another. This in turn allows the antenna to receive separate signalling for each tag, wherein the respective signalling for each tag is distinct from each other.

By arranging the tags in this way, it is possible for the reader of the first embodiment to determine the respective signal strengths of the respective sources/tags (as they are distinct from one another), and operate as described above.

As with all RFID systems, there is a collision probability that two or more tags will transmit their information at the same time, thus running the risk of signal interference. By providing for a relatively long transmission window, this helps to reduce the collision probability. To further reduce the probability of collision between tag transmissions, and to also accommodate the unlikely situation that two tags are exactly in sync with one another, a clock or timing offset (such as lengthy clock jitter, random timing offset, or predetermined offset) is introduced into the timing of the interval.

This means that each cycle of the interval for each tag will vary slightly from the exact set interval. This clock/timing offset helps to prevent any two tags transmission cycle from being exactly in synchrony with one another. In other words, this timing offset means that each tag transmits its next transmission burst at a slightly different time to every other tag (for example, either slightly before the set interval or slightly after the set interval). Even if there is a collision between transmission bursts from two or more tags/sources, the next transmission burst from each of the collided tags is unlikely to still be in synchrony again due to the clock offset present in each tags transmission protocol.

As a result, this arrangement allows the directional antenna of a reader (such as in the first embodiment) to receive the signalling from each tag separately (with a low probability of collision).

In such a situation, the signalling from the multiple sources (the two tags) is received by the antenna of the reader and passed to the determination circuit 3 via the input 1. As the respective signalling from the two tags are separate and distinct from one another, it is a comparatively simple matter to measure and determine the respective signal strengths of the received respective signalling. The rest of this embodiment operates in the same manner as the first embodiment, thereby providing the user with an indication as to the particular source and the information carried and transmitted by that source.

This arrangement can be considered as an asynchronous time division multiplexing system or protocol. This transmission protocol helps to ensure that each tag has its own transmission window to provide the information carried by the tag to the reader antenna. Each tag is not specifically assigned its own transmission slot as per a synchronous time division multiplexing system/protocol, rather the collision probability is reduced through introducing a timing variation/transmission protocol in each tag.

Two examples of possible RFID tags (or other radio frequency identification sources) according to the synchronous arrangement discussed above are shown in FIGS. 4a & 4b as a detailed schematic. We will not discuss these examples in detail as they are mentioned only for illustrative purposes to show the different functional elements of such tags/sources We will now describe an embodiment that utilises a synchronous time division multiplexing arrangement with reference to FIGS. 3a-3c (as opposed to the asynchronous arrangement discussed above).

In this embodiment, the reader uses a communication back-channel for control of and communication with the tags. This can be achieved using the same directional antenna or an additional antenna (for example, within an antenna array or a further distinct/separate antenna, or the like).

Figure 3A:
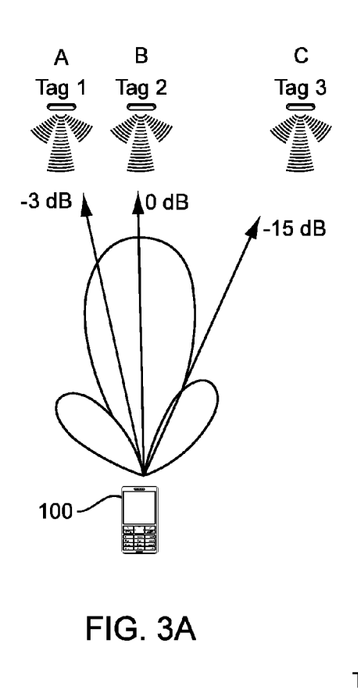
FIG. 3a illustrates a further complex embodiment operating in a different scenario.
Figure 4A:
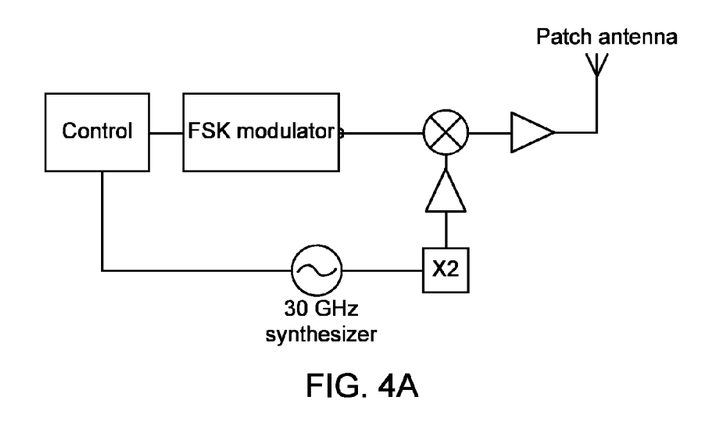
FIGS. 4a-4b illustrate schematically apparatus for providing radio frequency signalling.
Figure 4B:
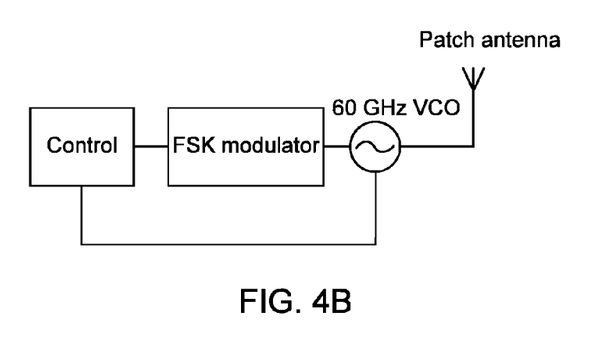

In this embodiment, the processor/apparatus comprises a back-channel control circuit (not shown) that is able to control the directional antenna to transmit a control signal to control the tags. This back-channel control circuit is electrically connected to the input so that the back-channel control circuit can transmit a low frequency to the tags using the connected antenna. This low frequency is typically lower than that on which the tags are transmitting their carried information. This is to keep the channels of communication separate and reduce interference. Also, the omnidirectionality of the lower-frequency antennas is preferable to ensure that the tags present receive the necessary information. FIG. 3a illustrates that there are three tags, A, B & C. The user is interested in one of these tags (tag B) and so points the reader directly at the tag of interest. As per the embodiments described above, the reader will then receive signalling from each of these tags.

Figures 3B, 3C:
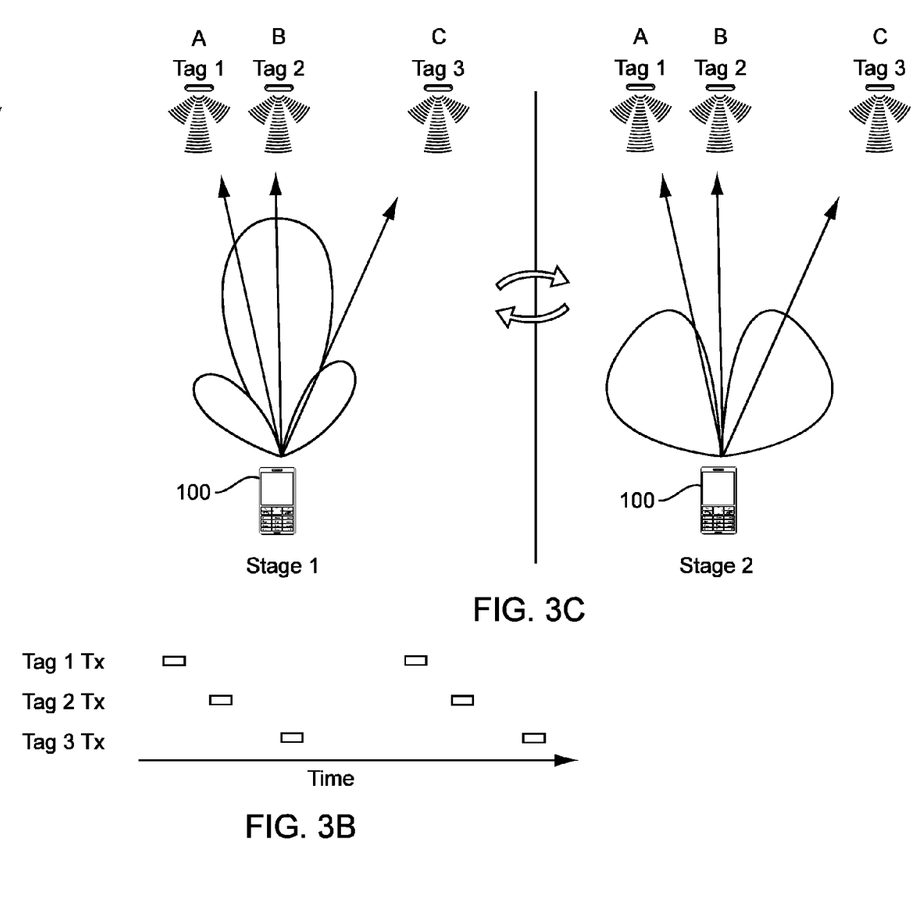
FIG. 3b illustrates time division multiplexing delays between received signalling.
FIG. 3c illustrates another embodiment operating in another scenario.

The reader is able to provide each tag in turn with an allocated time slot via the communication back-channel. The allocated time slots may be calculated in a number of ways so that the tag transmissions may be temporally interleaved (as shown in FIG. 3b). For example, in this embodiment, the time slots are calculated based on the number of tags present. To illustrate, in this example there are three tags. Once the reader/apparatus has received the signalling from the tags, the reader/apparatus can determine the number of tags present. The apparatus is to set a transmission protocol for the tags such that they each transmit separately and in turn over a designated time window.

FIG. 3b shows how this creates a regular pattern/transmission protocol for transmitting and receiving the respective signalling from each tag. As can be seen from this figure, the transmission protocol has included a buffer period either side of the short burst to help reduce the likelihood of overlap between transmissions. Each tag is allocated a transmission slot and a regular transmission cycle for the group of tags is established. An advantage to this arrangement is that the system can accommodate any number of active tags once the reader has identified the number of tags in a given situation and allocated each of them a particular time slot for transmitting. Once the number of transmitting tags is established and the number of expected transmission bursts is identified, the time between transmission bursts can be optimised to reduce the total length of each transmission cycle.

In some embodiments the apparatus may always have a set transmission cycle time that is subdivided based on however many tags are present. In other embodiments, the apparatus may always have a set subdivision of time for each tag, such that the total transmission cycle time is dependent on the number of tags present. In still other embodiments, the apparatus may optimise the transmission protocol based on a combination of factors.

Once the synchronous time division multiplexing protocol has been established, the signalling from each tag is separate and distinct from those of other tags, and the apparatus of the reader can operate as described in one or more of the above embodiments.

This lower-frequency back-channel can be used to control the tags in one or more different ways. For example, this can be done to save power by turning the tags on only when needed, to synchronize the tag transmissions in order to increase system capacity and to configure tags for transmission of larger data content.

We have now discussed both a synchronous and an asynchronous transmission protocol for use in radio frequency identification systems. There are also further variations that can utilise these different methods:

Asynchronous—In some embodiments only the packet repetition rate is determined. As discussed above, the relation of packet length to the repetition rate determines the collision probability of packets from different tags. This method/system relies on a sufficiently low collision probability. If a collision occurs, the lost pulses/packets will be received during the next cycle. A suitable clock/timing offset (such as a random or predetermined offset) helps to ensure that the same packets do not collide repeatedly. In such embodiments, the tags may repeat the same data content in each transmission burst. An acceptable limit for the collision probability determines the maximum number of tags the system can support within a certain area.

This method involves active or at least semi-active tags. As an example for the asynchronous case, the following set of values can be achieved with basic technology solutions (frequency: 60 GHz, 3 cm2 antenna):
Burst bit rate: 100 Mbps
Tag Tx power: 0 dBm
Max. data content: 3 kB
Max. number of tags in range: 15 (this may be smaller or larger depending on nature of the system).
Reading range: 30 m
Pointing resolution: 2 m at 30 m distance Battery life (tag): several years is realistic with e.g. 2×AA batteries (depends on use profile i.e. how many activations per day)

This asynchronous method of transmission helps to provide a robust way to receive and determine signal strength without specifically synchronising tags present.

Synchronous—In such synchronous embodiments, each tag is assigned a time slot for its transmission burst. In this way, the system capacity can be increased/optimised to provide a synchronization scheme is needed (for example, via the low frequency communication back-channel or uplink control channel discussed above). The increased capacity can be used either for larger data content per tag (longer transmission burst) or a higher number of tags. The control channel also enables changing the packet content since retransmission of lost packets can be requested The communication back-channel/control link can be used to activate the transmit sequence of the tags. To minimise interference and to save power, the tags can be set to send only when requested. During inactive periods a "wake-up radio" is monitoring the uplink requests. This can operate at a very low energy consumption level. The wake up requests can be general and activate all tags within range. Alternatively, certain predetermined categories of tags can be masked with suitable codes.

Uplink coding can also be used to mute the unwanted tags and reserve the channel for a prolonged data transmission from the desired tag. This can be done after the tag identification code has been read with the initial reading procedure. This helps to overcomes (at least temporarily) any data content limitation that may be present in the asynchronous time-multiplexed scheme. The uplink may also be used to control any other function in the tag.

Figure 2B:
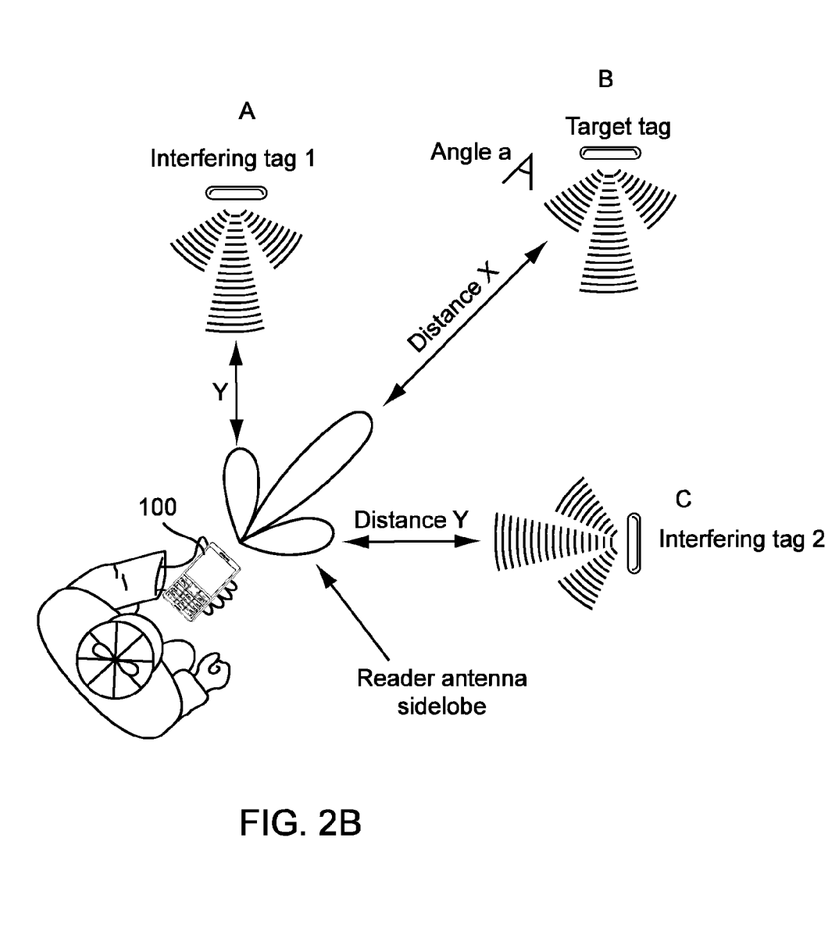
FIG. 2b illustrates another embodiment operating in another scenario.

The embodiments described provide different robust methods that help to separate out respective signalling from different sources. After this, the strongest signal is assumed to be the signalling from the particular source of interest. It should be pointed out that there are some situations that this assumption may not hold true for. For example, FIG. 2b illustrates three tags. The user points the reader at the particular tag of interest (tag B). Tag B is therefore on-axis with the reader. There are also two off-axis tags (A & C). However, the two off-axis tags A & C are closer to the reader than the on-axis tag B. Therefore, although the two off-axis tags A & C are not on-axis and being sensed with maximum sensitivity of the antenna, they are closer to the reader and this may cause their received signalling to be of a comparable magnitude to that of the on-axis but relatively distant tag of interest (tag B).

We will now describe a further embodiment that aims to address/alleviate this issue with reference to FIG. 3c.

FIG. 3c sets forth a simplified illustration of the scenario in FIG. 2b. This has been simplified so as to illustrate how this embodiment operates. As per FIG. 2b, the tag of interest is on-axis, but the respective signal strength of the signalling of this source is of similar magnitude to the two closer off-axis tags.

In this embodiment, the apparatus can operate in substantially the same way as any of the embodiments described above but with the following modifications.

Here, the directional antenna has two different modes: a first directional antenna mode, and a second monopulse antenna mode. In this embodiment, the directional antenna is switchable between the two modes (in that it operates in one mode or the other). In other embodiments the directional antenna is actually an array of antennas that can operate in both modes at the same time (such that signalling can be received simultaneously according to the two different receiving modes).

The first directional antenna mode is highly sensitive in a given axis (as illustrated by the first stage in FIG. 3c) as per the directional antenna in the abovedescribed embodiments. The second mode is a monopulse antenna mode that is axially insensitive along the same axis that the directional antenna is sensitive along. This can be considered to create a field null along the boresight of the antenna field. In this embodiment the directional antenna is an antenna array that is switchable between a first directional mode and a second monopulse mode. These distinct modes can be provided by separate antennas, or may also be achieved by suitable phasing of an antenna array.

In general, radiation nulls can be made significantly sharper than maxima. However, since the reception is at its weakest in the boresight direction it is not practical (in some embodiments) to use the monopulse antenna for primary communication between the reader and tags. Monopulse antennas are traditionally used for radar and satellite tracking. Monopulse antennas are well known in the art and will not discussed further here.

The sharpness of the monopulse null improves angular selectivity close to the boresight direction, whereas the depth of the null improves the dynamics between near and far target tags/sources as well as target tags/sources located near sidelobes of the radiation pattern.

In this situation, the reader receives signalling from each of the tags via the directional antenna mode first in substantially the same way as any of the above embodiments. Once signalling from each tag has been received whilst the antenna is in the first directional mode, the reader/apparatus then switches the antenna to the second monopulse mode and performs the same reading in a second step/stage. This provides two sets of signalling from the tags (one set for each mode). The two sets of signalling are passed to the determination circuit via the input.

The determination circuit then operates on the two sets to determine the respective signal strengths of each of the tags in relation to the two antenna modes. This will result in two sets of signal strengths in accordance with the tags measured in each antenna mode.

For illustrative purposes, we shall assume that the respective signal strengths of the three tags are identical when measured in the first antenna mode. This is due to the particular layout of the tags resulting in the distant on-axis tag B having the same signal strength as relatively close off-axis tags A & C. The determination circuit cannot distinguish which one is the tag of interest from this reading alone.

In the monopulse antenna mode, the antenna is axially insensitive along the axis directed at the desired tag of interest, whilst the sensitivity pattern is still roughly the same in all other directions. Therefore, the signal strengths of the two off-axis tags A & C will remain the same as those previously received by the antenna in the first mode/stage, whilst the signal strength of the on-axis tag of interest will be significantly reduced. Therefore, for a first set of signal strength readings the signal strengths are identical and indistinguishable even with on-axis sensitivity, whilst for the second set of readings, the signal strengths for all three tags A, B & C are not identical, and the on-axis tag can be identified by way of the null of the monopulse antenna arrangement.

The determination circuit 3 determines the respective signal strengths for each tag as received in each signal mode and passes this to the discrimination circuit 4. Based on the two sets of readings from the respective antenna modes, the discrimination circuit 4 can identify the particular tag of interest (tag B) over tags A & C. In essence, the desired tag has the highest difference between the first and second set of determined signal strengths. In other embodiments, the calculation may be slightly more elaborate to take into account the properties of the antenna beams and other effects. Other embodiments may also weigh the first and second (primary and secondary) received signal strengths differently. Also, more than one additional/secondary antennas could be used in other embodiments to further enhance or tune the effect By using the monopulse antenna mode, it is possible to improve the reading selectivity of one or more of the above embodiments. The sharp dip in the radiation pattern in the boresight direction helps to further resolve the respective tags from one another. By comparing the received signal strengths of the two antenna patterns as discussed above, angular resolution can be increased.

Figure 1B:
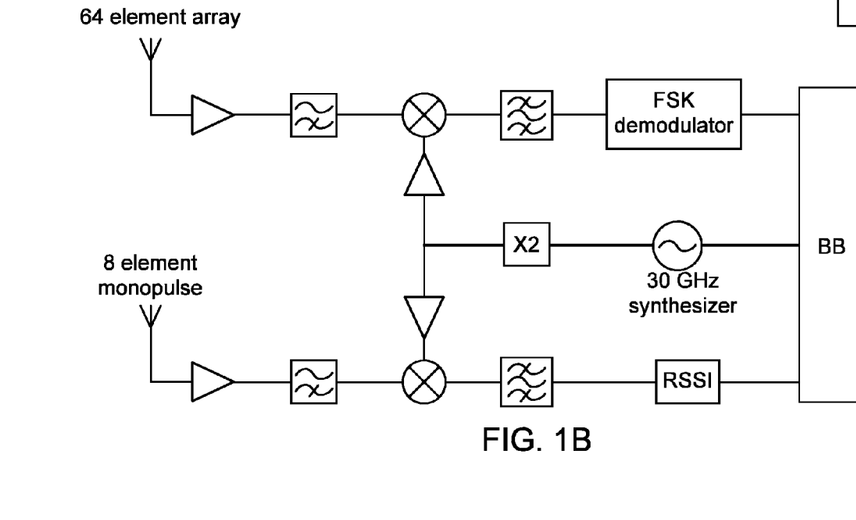
FIG. 1b illustrates schematically an example of a radio frequency identification reader for receiving radio frequency signalling from multiple radio frequency identification sources.

An example of an RFID tag reader according to the apparatus of the above embodiment is shown in FIG. 1b as a detailed schematic (i.e. utilising a directional antenna and a multimode antenna). We will not discuss this example in detail as it mentioned only for illustrative purposes to show the different functional elements of such a reader.

With regard to the nature of the directional antenna, the skilled person will appreciate that other antenna options are within the scope of the present disclosure. The skilled person will appreciate that, although the directional antenna is highly sensitive in one axis in one or more the abovedescribed embodiments, in other embodiments the directional antenna may be highly sensitive along more than one axis, highly insensitive along a particular axis, highly insensitive along more than one axis, or the like.

With regard to other embodiments, a video camera also included in a reader can also be used to assist a user in achieving a good on-axis 'aim' by the reader. It may be advantageous if such radio frequency identification sources are visually distinguishable from the environment or their location or is otherwise known (e.g. worn by people). This is to help ensure that users can find and aim a reader appropriately at the target tag of interest.

Figure 5:
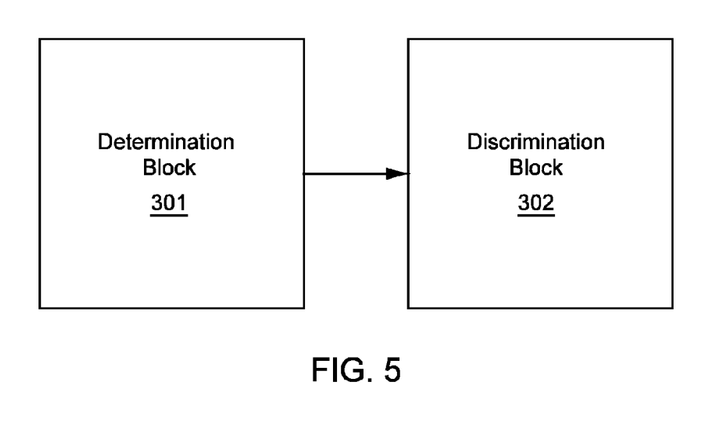
FIG. 5 illustrates a method of operation of one or more embodiments of the present disclosure.

One or more of the abovedescribed embodiments operate in accordance with the following method (as is illustrated in FIG. 5). The method involves the steps of;
- 301—determining respective signal strengths of radio frequency identification signalling received from multiple sources by a directional antenna; and
- 302—discriminating the radio frequency identification signalling from a particular source based on the particular signal strength of the radio frequency identification signalling received from that source.

Figure 1C:
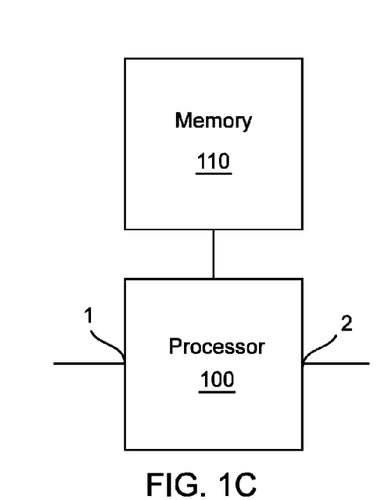
FIG. 1c illustrates a further embodiment of the present disclosure.

To illustrate how this can be implemented, for example in FIG. 1c, the memory 110 can comprise program code that is configured to perform the respective steps of this method when run in conjunction with the processor 100. Other embodiments may also have further lengths of program code configured to operate other aspects of the invention. For example, other aspects controllable by program code could be for configuring the antenna arrangements, sampling signalling or processing/operating on signalling (for example, to determine strengths and/or data content) or the like. Other further program code may be provided for calculating time slots for transmission in accordance with different transmission protocols discussed above, or optimizing such transmission times/protocols, or the like.

As this method has been discussed in detail above with respect to various embodiments, this will not be discussed further in detail.

Figure 6:
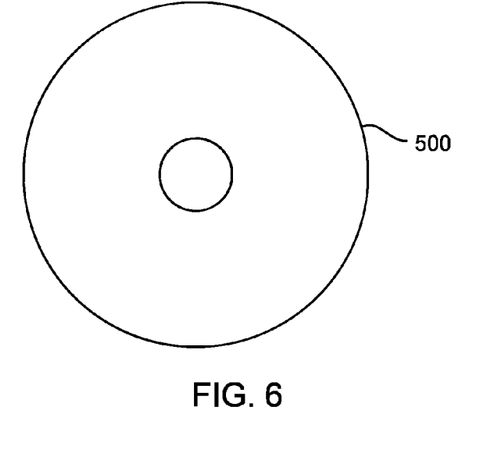
FIG. 6 illustrates schematically a computer readable media providing a program according to an embodiment of the present disclosure.

FIG. 6 illustrates schematically a computer/processor readable media 500 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, for example, switched on, or the like. In such cases, they may not necessarily have the appropriate software loaded into the active memory in the non-enabled (for example, switched off state) and only load the appropriate software in the enabled (for example, on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (for example, memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (for example, including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
a directional antenna configured to receive high frequency radio frequency identification signalling from multiple sources when the directional antenna is oriented in the direction of a particular source of the multiple sources and operating in both a directional antenna mode and a monopulse antenna mode, the multiple sources each configured to provide their respective high frequency radio frequency identification signalling at a frequency of at least 60 GHz and at different times;
a determination circuit configured to determine respective signal strengths of the high frequency radio frequency identification signalling received from the multiple sources by the directional antenna; and
a discrimination circuit configured to discriminate the high frequency radio frequency identification signalling from the particular source based on a greatest difference in signal strength between the directional and monopulse antenna modes for that particular source as a result of the orientation of the directional antenna.

2. The apparatus of claim 1, wherein the apparatus is configured to receive high frequency radio frequency signalling from radio frequency identification tags.

3. The apparatus of claim 1, wherein the apparatus is configured to allocate transmission times to each of the multiple sources such that they provide their respective high frequency radio frequency identification signalling at different times.

4. The apparatus of claim 3, wherein the apparatus is configured to allocate transmission times in accordance with a synchronous time-division multiplexing protocol.

5. The apparatus of claim 3, wherein the apparatus is configured to include a buffer period in the allocated transmission times.

6. The apparatus of claim 1, wherein the apparatus is one or more of a processor, a portable electronic device and an RFID tag reader.

7. A system comprising the apparatus of claim 1, and one or more high frequency radio frequency identification signalling sources.

8. The system of claim 7, wherein the one or more high frequency radio frequency identification signalling sources are RFID tags.

9. An apparatus comprising:
means for directionally receiving high frequency radio frequency identification signalling from multiple sources when the means for directionally receiving are oriented in the direction of a particular source of the multiple sources and operating in both a directional antenna mode and a monopulse antenna mode, the multiple sources each configured to provide their respective high frequency radio frequency identification signalling at a frequency of at least 60 GHz and at different times;
means for determining respective signal strengths of the high frequency radio frequency identification signalling received from the multiple sources by the means for directionally receiving; and
means for discriminating the high frequency radio frequency identification signalling from the particular source based on a greatest difference in signal strength between the directional and monopulse antenna modes for that particular source as a result of the orientation of the means for directionally receiving.

10. A method comprising:
receiving high frequency radio frequency identification signalling from multiple sources using a directional antenna oriented in the direction of a particular source of the multiple sources and operating in both a directional antenna mode and a monopulse antenna mode, the multiple sources each configured to provide their respective high frequency radio frequency identification signalling at a frequency of at least 60 GHz and at different times;
determining respective signal strengths of the high frequency radio frequency identification signalling received from the multiple sources by the directional antenna; and
discriminating the high frequency radio frequency identification signalling from the particular source based on a greatest difference in signal strength between the directional and monopulse antenna modes for that particular source as a result of the orientation of the directional antenna.

11. A non-transitory computer readable medium having computer program code stored thereon, wherein the code is configured to, upon being executed:
determine respective signal strengths of high frequency radio frequency identification signalling received from multiple sources by a directional antenna oriented in the direction of a particular source of the multiple sources and operating in both a directional antenna mode and a monopulse antenna mode, the multiple sources each configured to provide their respective high frequency radio frequency identification signalling at a frequency of at least 60 GHz and at different times; and discriminate the high frequency radio frequency identification signalling from the particular source based on a greatest difference in signal strength between the directional and monopulse antenna modes for that particular source as a result of the orientation of the directional antenna.

* * * * *